(12) United States Patent
Gupta et al.

(10) Patent No.: US 11,803,402 B1
(45) Date of Patent: Oct. 31, 2023

(54) RECOMMENDATIONS FOR INFORMATION TECHNOLOGY SERVICE MANAGEMENT TICKETS

(71) Applicant: SAP SE, Walldorf (DE)

(72) Inventors: Sidharth Gupta, Gurgaon (IN); Nitin Chavan, Bangalore (IN); Rohan Koul, Gurgaon (IN); Sudhir Verma, Gurgaon (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/079,522

(22) Filed: Dec. 12, 2022

(51) Int. Cl.
| | |
|---|---|
| *G06F 11/07* | (2006.01) |
| *G06F 9/451* | (2018.01) |
| *G06N 20/00* | (2019.01) |
| *G06F 3/0484* | (2022.01) |

(52) U.S. Cl.
CPC ............ *G06F 9/453* (2018.02); *G06F 3/0484* (2013.01); *G06F 11/0793* (2013.01); *G06N 20/00* (2019.01)

(58) Field of Classification Search
CPC .... G06F 9/453; G06F 3/0484; G06F 11/0793; G06F 11/3006; G06F 9/4881; G06F 11/302; G06F 11/3476; G06F 16/355; G06F 11/0751; G06F 16/35; G06F 16/23; G06F 16/951; G06N 20/00; G06N 3/08; G06N 5/04; G06N 3/04; H04N 7/18; H04L 51/02; H04L 41/0823; H04L 41/16; H04L 41/149; H04L 67/63; G06Q 40/12; G06Q 50/00; G06Q 20/386; G06Q 30/02; G06Q 30/015; G06Q 10/10; G16H 40/40; G05B 23/0232; H04W 76/10; H04W 76/11; H04W 4/12

See application file for complete search history.

(56) References Cited

U.S. PATENT DOCUMENTS

| | | | | |
|---|---|---|---|---|
| 2017/0286972 | A1* | 10/2017 | Hausler | .................. G06N 3/044 |
| 2020/0005213 | A1* | 1/2020 | Clemens | ........ G06Q 10/063114 |
| 2020/0204680 | A1* | 6/2020 | Prakash | .................. G06N 20/00 |
| 2020/0258013 | A1* | 8/2020 | Monnett | ............. H04L 41/5074 |
| 2021/0149979 | A1* | 5/2021 | Nagarjuna | .............. G06F 16/36 |

(Continued)

FOREIGN PATENT DOCUMENTS

| | | | | |
|---|---|---|---|---|
| CA | 2955330 | A1 * | 7/2012 | ........... G06F 16/583 |
| CA | 3124442 | A1 * | 8/2020 | ........... G06F 3/0482 |

(Continued)

*Primary Examiner* — Steven P Sax
(74) *Attorney, Agent, or Firm* — SCHWEGMAN LUNDBERG & WOESSNER, P.A.

(57) ABSTRACT

A computer system may obtain reference ticket data for reference tickets of an online system, with the reference ticket data indicating a reference issue for a reference component and a reference solution, and also obtain learning content items from a learning management system. The computer system may then create a mapping between the reference issues indicated by the reference ticket data for the reference tickets and the learning content items using an unsupervised machine learning algorithm. The computer system may detect target ticket data that has been provided by a user to the online system via a computing device, with the target ticket data indicating a target issue for a target component, identify a target solution for the target issue based on the target ticket data using the mapping, and cause a recommendation of the target solution to be displayed on the computing device.

14 Claims, 6 Drawing Sheets

(56) References Cited

U.S. PATENT DOCUMENTS

| | | | | |
|---|---|---|---|---|
| 2021/0192412 A1* | 6/2021 | Krishnaswamy | .. | G06Q 30/0201 |
| 2021/0328888 A1* | 10/2021 | Rath | ............ | H04L 41/5074 |
| 2021/0398029 A1* | 12/2021 | Royall, Jr. | ............. | G06Q 10/02 |
| 2022/0038348 A1* | 2/2022 | Mayor | ................ | H04L 43/0805 |
| 2022/0107802 A1* | 4/2022 | Rao | ...................... | G06F 16/907 |
| 2022/0131766 A1* | 4/2022 | Bais | .................. | H04L 41/5074 |
| 2022/0141715 A1* | 5/2022 | Mayor | ................ | H04L 41/5074 |
| | | | | 370/254 |
| 2022/0292210 A1* | 9/2022 | Jain | ..................... | G06F 21/6218 |
| 2022/0308990 A1* | 9/2022 | DeLuca | .................. | G06F 40/30 |
| 2022/0374263 A1* | 11/2022 | Ban | ....................... | G06F 11/079 |
| 2023/0139289 A1* | 5/2023 | Veggalam | ............. | H04L 41/149 |
| | | | | 709/223 |
| 2023/0187059 A1* | 6/2023 | Schmidt | ................ | G16H 40/40 |
| | | | | 705/2 |

FOREIGN PATENT DOCUMENTS

| | | | | | |
|---|---|---|---|---|---|
| CA | 3142624 | A1 * | 12/2020 | ......... | G06F 16/3329 |
| CA | 3051653 | A1 * | 2/2021 | | |
| CA | 3164413 | A1 * | 7/2021 | ......... | G06F 16/3329 |
| CN | 112419567 | A  * | 2/2021 | | |
| CN | 114051740 | A  * | 2/2022 | ............ | G06Q 10/10 |
| EP | 3798841 | A1 * | 3/2021 | ......... | G05B 19/4184 |
| LU | 102633 | B1 * | 9/2022 | | |
| WO | WO-2022183138 | A2 * | 9/2022 | | |

\* cited by examiner

RECOMMENDATIONS FOR INFORMATION TECHNOLOGY SERVICE MANAGEMENT TICKETS

BACKGROUND

Information technology service management (ITSM) systems provide process and workflows that information technology (IT) teams use to provide their services in a company. Incidence management, change management, and problem management are some core processes in ITSM systems. These processes use software and tools that are used to manage and track problems, incidents, change and release level management, configuration management, and other issues.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Figure 1:
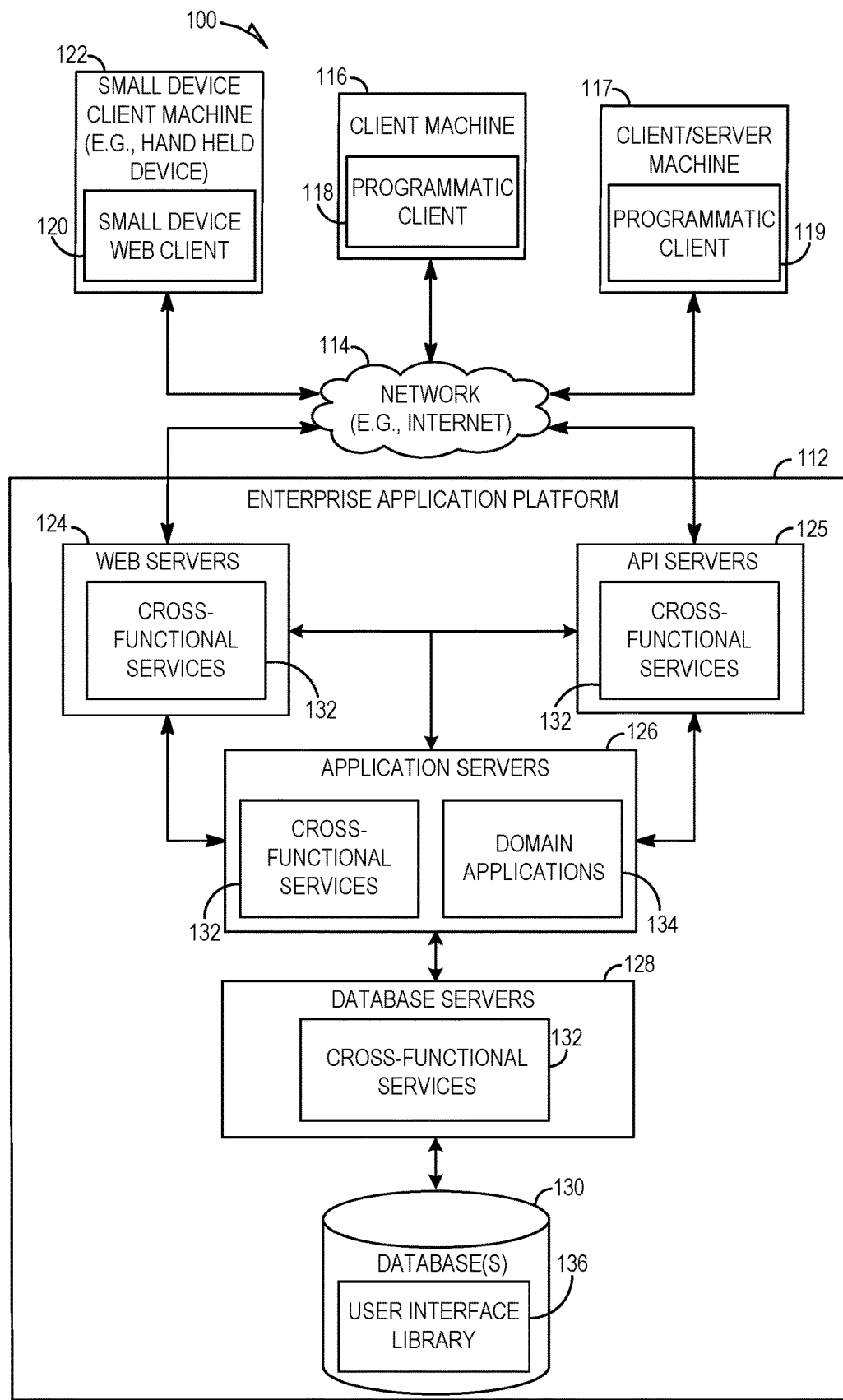
FIG. 1 is an example network diagram illustrating a system.

Example methods and systems of providing machine-learned recommendations for information technology issues using an integration of an ITSM system and a learning management system are disclosed. In the following description, for purposes of explanation, numerous specific details are set forth in order to provide a thorough understanding of example embodiments. It will be evident, however, to one skilled in the art that the present embodiments can be practiced without these specific details.

ITSM system may use ticketing software to allows organizations to resolve their internal IT issues by streamlining the resolution process. The elements they handle, called tickets, provide context about the issues, including details, categories, and any relevant tags. A ticket is a special document or record that represents an incident, alert, request, event, or some other issue that requires action from the IT department. It often contains additional contextual details and may also include relevant contact information of the individual who created the ticket. A user having a technical problem or concern may send a ticket to their IT department for help in resolving the issue. Although ticketing systems are a useful way to help users address IT component issues, the creation, transmission, and processing of tickets may put a strain on the underlying computer system, since each additional ticket that is created, transmitted, and processed consumes system resources (e.g., processing power, network bandwidth, memory) and human resources (e.g., effort for an engineer, etc.). In addition to the issues discussed above, other technical problems may arise as well.

The implementation of the features disclosed herein involves a non-generic, unconventional, and non-routine operation or combination of operations. By applying one or more of the solutions disclosed herein, some technical effects of the system and method of the present disclosure are to integrate an ITSM system and a learning management system to provide machine-learned recommendations for resolving issues to users. In some example embodiments, a computer system may obtain reference ticket data for reference tickets of an ITSM system, with the reference ticket data indicating a reference issue for a reference IT component and a reference solution, and also obtain learning content items from a learning management system. The computer system may then create a mapping between the reference issues indicated by the reference ticket data for the reference tickets and the learning content items using an unsupervised machine learning algorithm. The computer system may detect target ticket data that has been provided by a user to the ITSM system via a computing device, with the target ticket data indicating a target issue for a target IT component, identify a target solution for the target issue based on the target ticket data using the mapping, and cause a recommendation of the target solution to be displayed on the computing device.

By employing the features disclosed herein, the computer system effectively reduces the number of tickets created, transmitted, and processed in resolving information technology component issues, thereby minimizing the consumption of system resources and the burden on the underlying computer infrastructure. Consider a cloud software customer getting stuck in an important step. For example, a warehouse manager may be unable to update freight charges for shipment in a transport management system. Instead of raising a ticket for this issue, the warehouse manager may be suggested a learning resource. After going through the online course, the warehouse manager may gain the skill to resolve the issue without the need to raise a ticket. As a result, the software company will have reduced the number of tickets and, thereby, saved resources. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
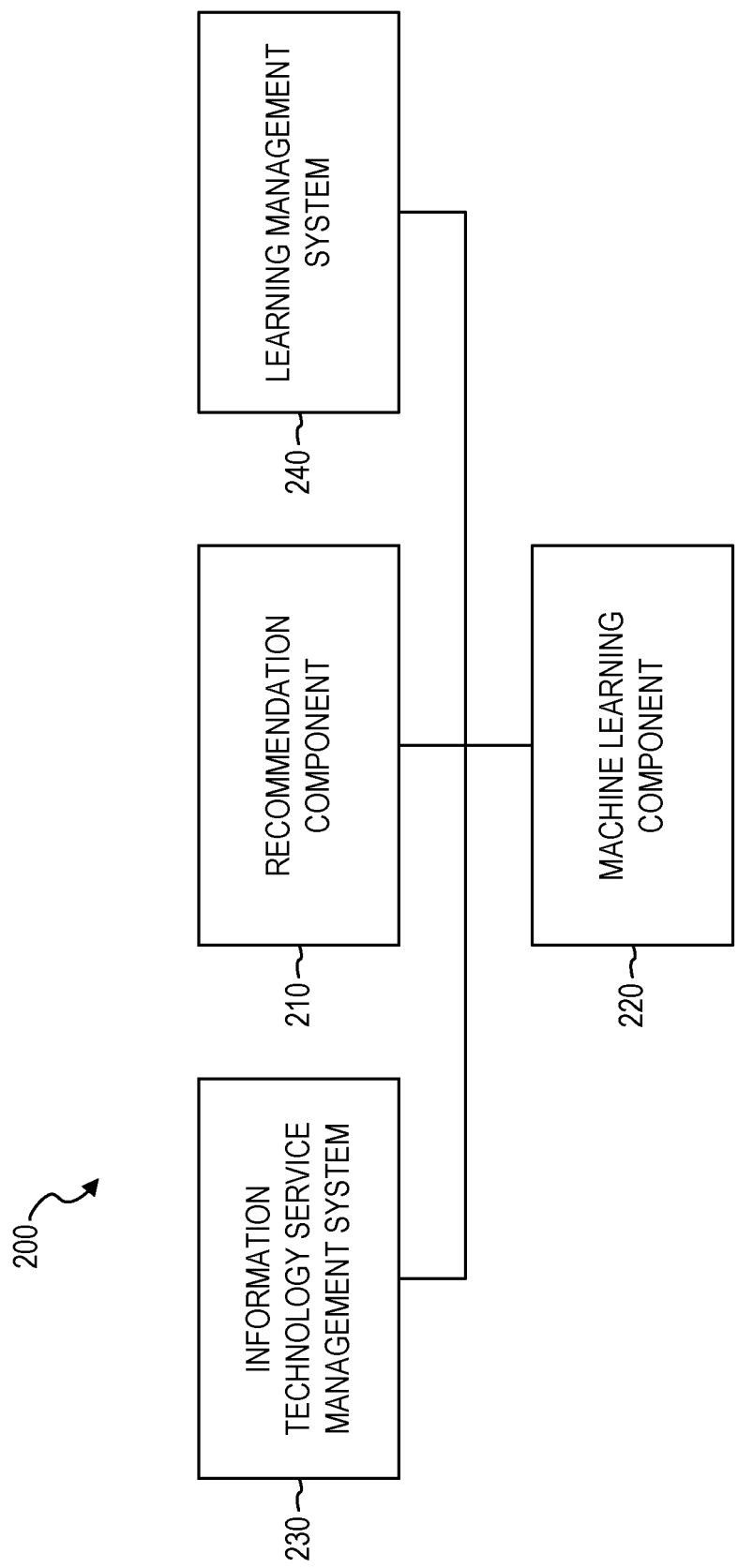
FIG. 2 is a block diagram illustrating an example integrated system.

FIG. 2 is a block diagram illustrating an example integrated system 200. In some example embodiments, the integrated system 200 may comprise any combination of one or more of a recommendation component 210, a machine learning component 220, an information technology service management (ITSM) system 230, and a learning management system 240. One or more of the components of the integrated system 200 may be implemented by the enterprise application platform 112 of FIG. 1. However, the integrated system 200 may be implemented in other ways as well. The components shown in FIG. 2 may be configured to communicate with each other via one or more network connections (e.g., via the network 114 of FIG. 1).

The term "reference" is used herein to indicate data and entities being used or involved in operations performed by the machine learning component 220. The term "target" is used herein to indicate data and entities being used or involved in the operations performed by the recommendation component 210.

The ITSM system 230 may comprise a ticketing system that handles tickets for issues involving information technology components. Such issues may include, but are not limited to, events, alerts, incidents, and requests. Event tickets are tickets that contain a record of activities in an IT environment. Examples of events include, but are not limited to, outages, releases, and maintenance activities. Alert tickets inform users of activities that are happening in their IT environment. Alert tickets are system-generated and automated through monitoring and error handling. Incident tickets represent service disruptions or a decrease in the quality of an IT service. Examples of incidents include, but are not limited to, outages, performance issues, and errors. Request tickets contain requests, such as requests for a password reset, an application installation, and a software update. Users may create tickets through a self-service online form of the ITSM system 230 to request technical support.

The learning management system 240 may comprise a software application that is configured to perform administration, documentation, tracking, reporting, automation, and delivery of educational courses, training programs, materials, or learning and development programs. The learning management system 240 may deliver and manages all types of content, including video, courses, workshops, and documents. Additionally, the learning management system 240 may be configured to track the consumption of the learning content that it provides to its users. For example, the learning management system 240 may store a record of the specific learning content items that each user views, watches, listens to, or otherwise consumes.

The integrated system 200 may integrate the ITSM system 230 and the learning management system 240 using the recommendation component 210 and the machine learning component 220. Recommendation systems may be used to suggest items like a learning resource. The suggestions may be based on aggregated information from multiple users, which is known as collaborative filtering. It can also be based on machine learning that classifies information based on a user interest and content generated by the user, which is known as content filtering. Here, machine learning may be used to classify information in groups that will be interesting to user or not interesting to user. Another aspect of recommendations may be based on a hybrid approach of content based and collaborative content filtering. In this approach, different combinations liked a merged ranking of both content and collaborative filtering, or a weighted average of both systems are taken. The hybrid approach attempts to overcome disadvantages of collaborative filtering, which is dependent of number of users in the data, and content-based fileting, which is based on the amount data generated by a user.

In order to facilitate the integration of the ITSM system 230 and the learning management system 240, the learning management system 240 may be configured to comprise a variety of different features in order to make it operate more effectively and efficiently. One feature that may be employed by the learning management system 240 is a no-code implementation. No-code is a software development approach that requires few, if any, programming skills to quickly build an application, which allows users who have the necessary institutional knowledge and understand the business requirements for an application, but lack knowledge of programming languages, to create software applications or add functionality to an existing site or application. The heavy lifting is done by the no-code tool providers that use data abstraction and encapsulation to essentially hide the complexity of what users accomplish through simple maneuvers, such as dragging and dropping application components, to build an application. No-code uses a visual integrated development environment. A no-code implementation means that there is no need for admins to hire a developer and implement features. As a result, new changes and features in course tracking and management can be implemented without delays or cost overheads.

Another feature that may be employed by the learning management system 240 is a headless implementation. In a headless implementation, a front end or presentation layer is a stand-alone piece of software, which through API communicates with a back end or data access layer. The front end and the back end operate separately from each other, and may be placed on separate servers, creating a minimum version of a multi-server architecture. The bridge between the front end and the back end is an API client. The endpoints of the API are connected to each other. By using this headless implementation, technical advantages may be achieved, such as performance optimization and flexibility of the software stack. Additionally, using a headless implementation for the learning management system 240 means that learning resources can be accessed, and thereby tracked, in any application or site, which helps in streamlining content management and tracking. Features such as API's for different applications, sites, and platforms, as well as single sign-on (SSO) integration may be used in achieving the headless implementation for the learning management system 240. The learning management system 240 may also be configured to support multiple formats and delivery channels that can be serviced and tracked through a common platform.

The machine learning component 220 may be configured to obtain corresponding reference ticket data for each one of a plurality of reference tickets of the ITSM system 230. The reference ticket data may indicate a reference issue for a reference information technology component and a reference solution that was used to resolve the reference issue. In some example embodiments, the machine learning component 220 may obtain the corresponding reference ticket data for each one of the plurality of reference tickets by establishing a network connection with the ITSM system 230 using an application programming interface (API) for the ITSM system 230 and obtaining the corresponding reference ticket data using the network connection with the ITSM system 230.

The machine learning component 220 may also be configured to obtain a plurality of learning content items from the learning management system 240. In some example embodiments, the machine learning component 220 may obtain the plurality of learning content items from the learning management system 240 by using a data scraping program to extract the plurality of learning content items from the learning management system 240. The plurality of learning content items may comprise online courses, online learning paths, online blogs, or online articles.

In some example embodiments, the machine learning component 220 may be configured to create a mapping between the reference issues indicated by the reference ticket data for the plurality of reference tickets and the plurality of learning content items based on the reference ticket data of the plurality of reference tickets and the plurality of content items using an unsupervised machine learning algorithm. The unsupervised machine learning algorithm may comprise a clustering algorithm. However, other types of unsupervised machine learning algorithms are also within the scope of the present disclosure.

The recommendation component 210 may be configured to detect target ticket data that has been provided by a user to the ITSM system 230 via a computing device. The target ticket data may indicate a target issue for a target information technology component. The recommendation component 210 may identify a target solution for the target issue based on the target ticket data using the mapping between the reference issues indicated by the reference ticket data for the plurality of reference tickets and the plurality of learning content items. In some example embodiments, the recommendation component 210 may be configured to cause a recommendation of the target solution to be displayed on the computing device. The recommendation of the target solution may comprise steps for the user to perform to resolve the target issue. The recommendation of the target solution may additionally or alternatively comprise one or more corrections to be implemented for code corresponding to the target information technology component. The recommendation of the target solution may additionally or alternatively comprise a selectable link to one of the plurality of learning content items.

Figure 3:
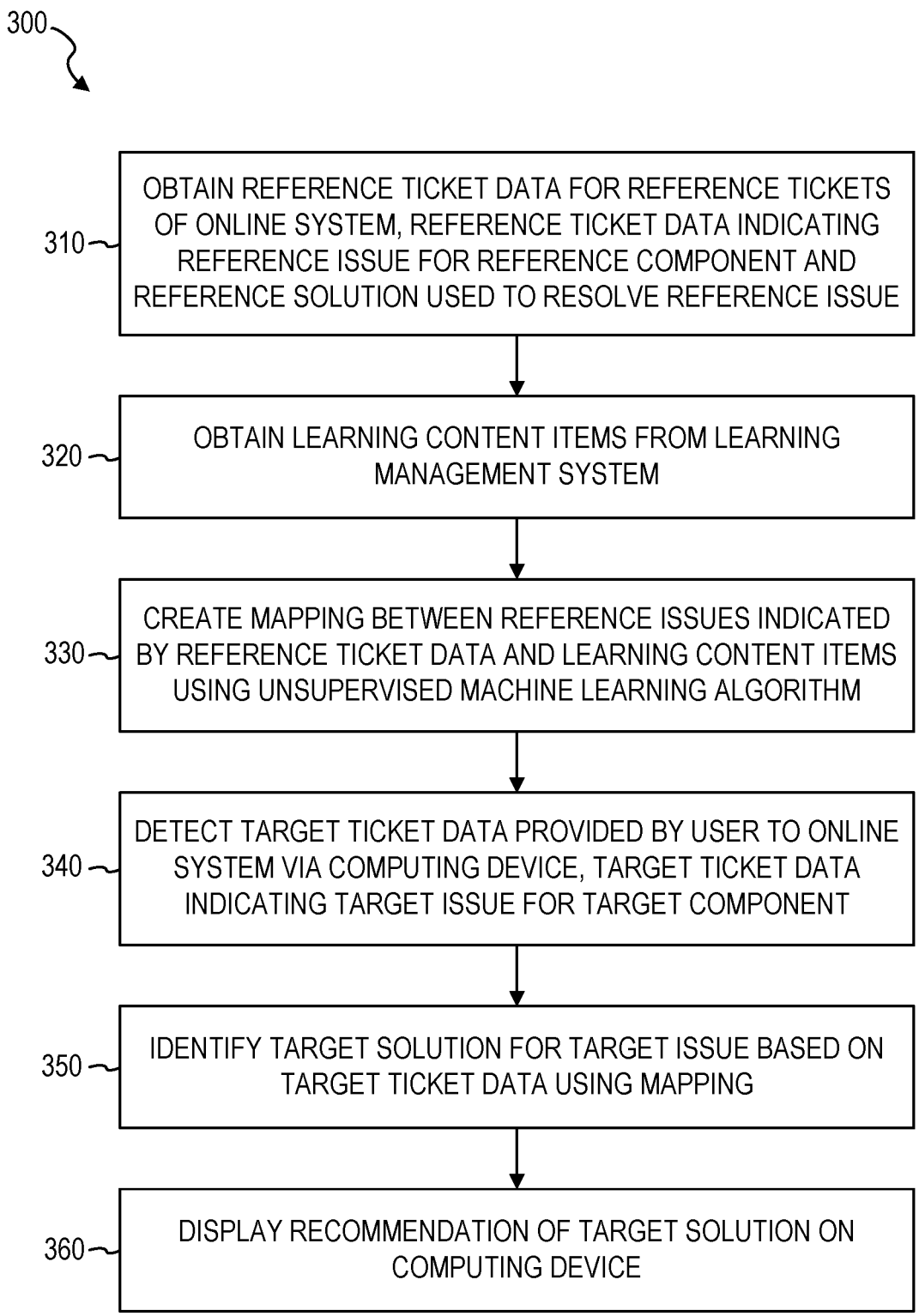
FIG. 3 is a flowchart illustrating an example method of providing a recommendation of a solution for an issue using an integration of an ITSM system and a learning management system.

FIG. 3 is a flowchart illustrating an example method 300 of providing a recommendation of a solution for an issue using an integration of the ITSM system 230 and the learning management system 240. The method 300 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 300 are performed by the integrated system 200 of FIG. 2 or any combination of one or more of its components (e.g., the recommendation component 210, the machine learning component 220).

At operation 310, the integrated system 200 may obtain corresponding reference ticket data for each one of a plurality of reference tickets of an online system. The online system may comprise an information technology management (ITSM) system. The reference ticket data may indicate a reference issue for a reference information technology component and a reference solution that was used to resolve the reference issue. In some example embodiments, the obtaining the corresponding reference ticket data for each one of the plurality of reference tickets may comprises establishing a network connection with the ITSM system using an application programming interface (API) for the ITSM system and obtaining the corresponding reference ticket data using the network connection with the ITSM system.

The integrated system 200 may, at operation 320, obtain a plurality of learning content items from a learning management system. In some example embodiments, the obtaining the plurality of learning content items from the learning management system may comprise using a data scraping program to extract the plurality of learning content items from the learning management system. The plurality of learning content items may comprise online courses, online learning paths, online blogs, or online articles. The learning management system may comprise a no-code implementation. The learning management system may also comprise a headless implementation.

Then, the integrated system 200 may create a mapping between the reference issues indicated by the reference ticket data for the plurality of reference tickets and the plurality of learning content items based on the reference ticket data of the plurality of reference tickets and the plurality of content items using an unsupervised machine learning algorithm, at operation 330. In some example embodiments, the unsupervised machine learning algorithm may comprise a clustering algorithm.

At operation 340, the integrated system 200 may detect target ticket data that has been provided by a user to the ITSM system via a computing device. The user may have entered the target ticket data via a ticketing software program of the ITSM system. The target ticket data may indicate a target issue for a target information technology component.

Next, the integrated system 200 may, at operation 350, identify a target solution for the target issue based on the target ticket data using the mapping between the reference issues indicated by the reference ticket data for the plurality of reference tickets and the plurality of learning content items. For example, the integrated system 200 may compare the target issue for the target information technology component indicated by the target ticket data with the reference issues in the mapping to find a match, and then identify the target solution that is mapped to the matched reference issue as the target solution.

Then, the integrated system 200 may cause a recommendation of the target solution to be displayed on the computing device, at operation 360. The recommendation of the target solution may comprise steps for the user to perform to resolve the target issue. The recommendation of the target solution may additionally or alternatively comprise one or more corrections to be implemented for code corresponding to the target information technology component. The recommendation of the target solution may additionally or alternatively comprise a selectable link to one of the plurality of learning content items.

It is contemplated that any of the other features described within the present disclosure can be incorporated into the method 400.

Figure 4:
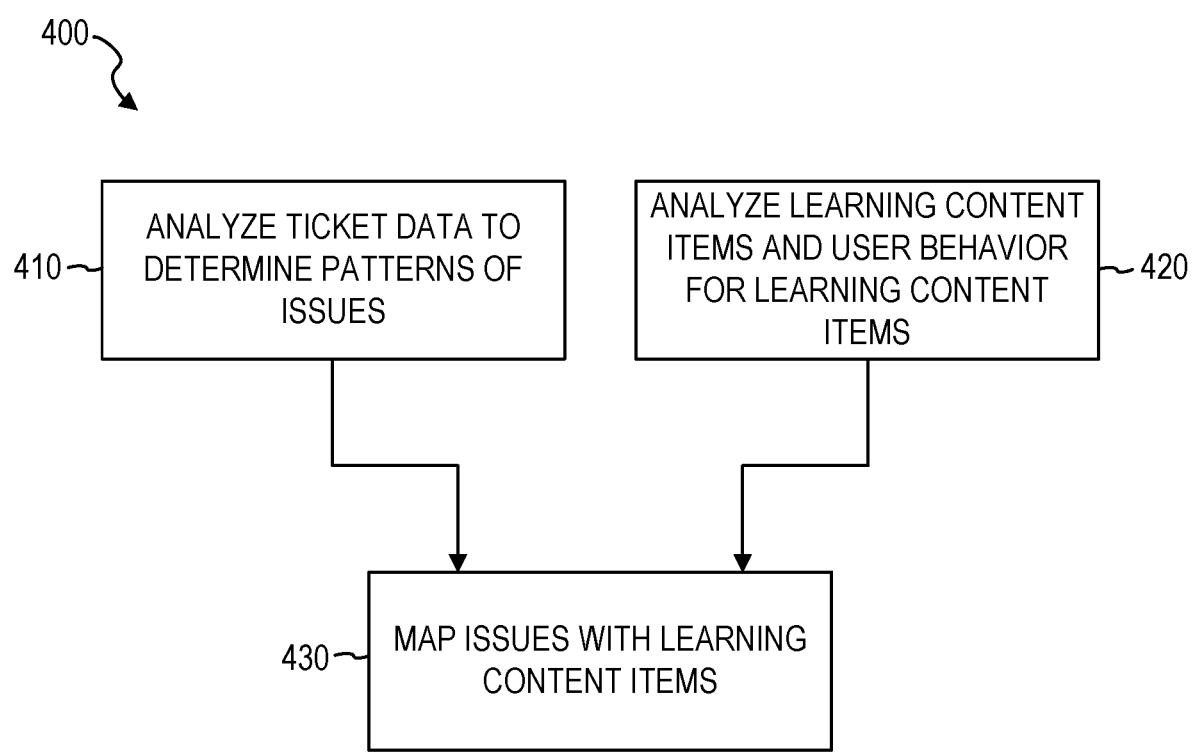
FIG. 4 illustrates an example process flow for mapping issues with learning content items of a learning management system.

FIG. 4 illustrates an example process flow 400 for mapping issues with learning content items of a learning management system. The process flow 300 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the process flow 400 are performed by the machine learning component 220.

At operation 410, the machine learning component 220 may analyze reference tickets to determine important patterns of issues. For example, the machine learning component 220 may identify issues that learning resources can resolve, such as a particular problem with a particular component of an online service. The machine learning component 220 may use an unsupervised machine learning algorithm to identify the issues.

At operation 420, the machine learning component 220 may analyze learning content items by analyzing available learning resources. For example, the machine learning component 220 may analyze the content of the learning content items, as well as any metadata of the learning content items. The machine learning component 220 may also analyze user behavior for learning content items based on a tracking of user consumption of the learning content items. For example, the machine learning component 220 may analyze what learning content items were consumed by users and for what types of issues were they consumed.

At operation 430, the machine learning component 220 may map issues with learning content items for use in suggesting learning content items to users to address issues based on the analyses of operations 410 and 420. In some example embodiments, the machine learning component 220 may use an unsupervised machine learning algorithm to map the issues with the learning content items.

It is contemplated that any of the other features described within the present disclosure can be incorporated into the process flow 400.

Figure 5:
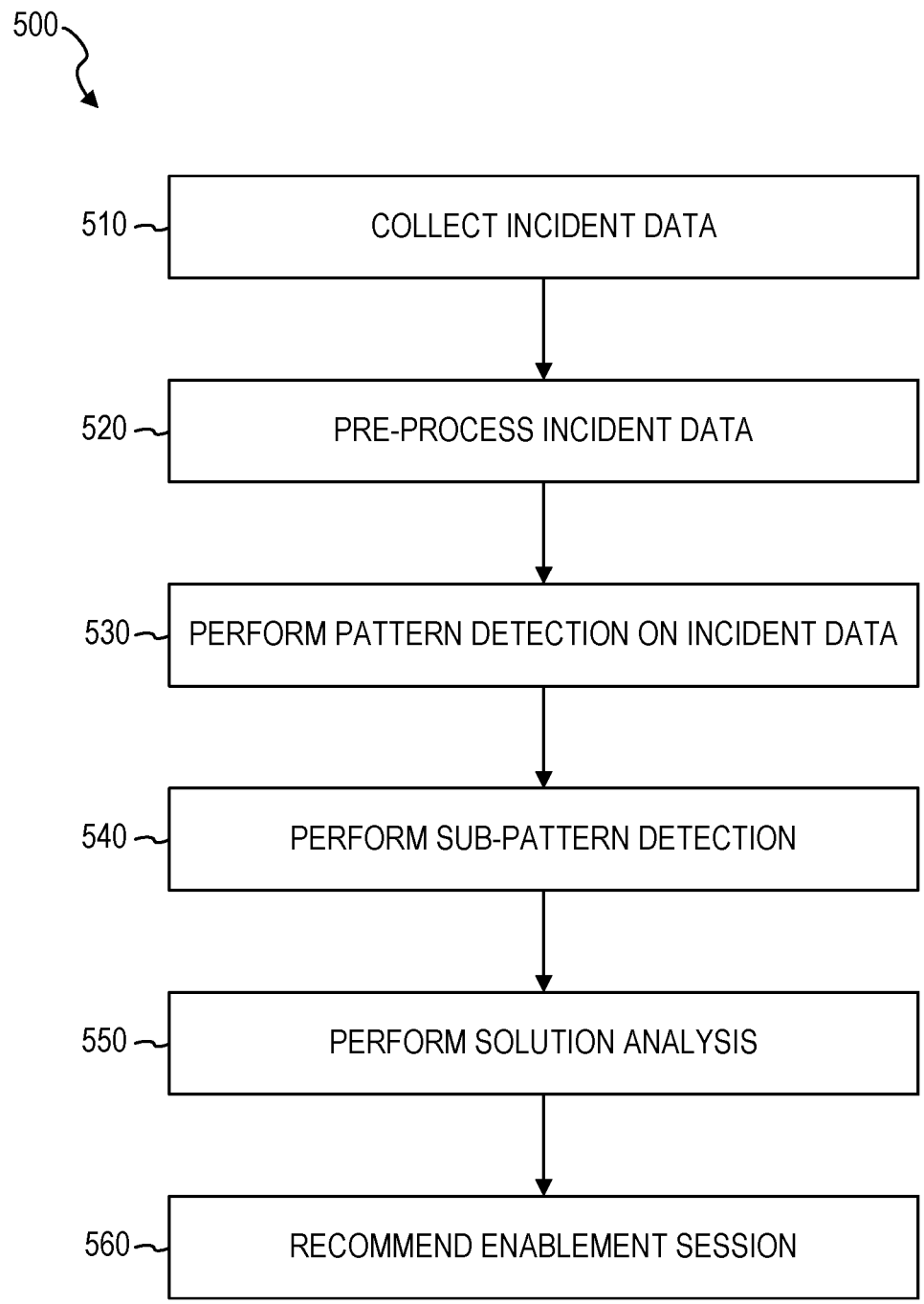
FIG. 5 is a flowchart illustrating an example method of analyzing ticket data.

FIG. 5 is a flowchart illustrating an example method 500 of analyzing ticket data. The method 500 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 500 are performed by the integrated system 200 of FIG. 2 or any combination of one or more of its components (e.g., the recommendation component 210, the machine learning component 220).

At operation 510, the integrated system 200 may collect corresponding incident data for a plurality of reference tickets. The incident data may contain various parts or fields that provide various information relating to the issue involved in the reference tickets. Examples of such incident data include, but are not limited to, a description of the incident, a summary of the communications between users involved in creating and resolving the reference ticket, and attachments included in the communications between the users involved in creating and resolving the reference ticket.

At operation 520, the integrated system 200 may pre-process the incident data. The description field may provide a summary of the issue. As a part of the pre-processing the raw data, the integrated system 200 may perform steps such as stop-word removal, which helps to filter out irrelevant words (e.g., at, in, the), and lemmatization, which helps to bring a word to its root form (e.g., maintenance maintain).

At operation 530, the integrated system 200 may perform pattern detection on the pre-processed incident data. As the text data cannot be directly fed to the algorithms, it needs to be converted to a numerical format. Therefore, after the pre-processing, vectorization of the description may be performed with TF-IDF Vectorizer (Term Frequency—Inverse Document Frequency), which transforms the text into a usable and numerical form (vector of numbers between 0 and 1). The vectors corresponding to each description may then be used to calculate the similarity with other vectors. The similarity may be calculated using cosine similarity, which is a metric used for measuring the similarity between two sentences by dividing the dot product and Euclidean norm of the vectors. The cosine similarity of a description of a incident with every other customer incident provides a hint of what are the closely related incidents having similar root cause. The integrated system 200 may also collect the top relevant keyword by phrase analysis (N-Gram analysis). The relevance of a keyword may be determined by calculating how frequently a keyword forms a part of bi/tri/quad gram. A collective output that obtained from cosine similarity and N-Gram analysis may be used to identify the keywords that can be used to split the incident data into patterns (clusters). The most relevant and frequently occurring sequence of keywords in a pattern may be used to name the pattern.

At operation 540, the integrated system 200 may perform sub-pattern detection. If a pattern consists of many incidents (e.g., greater than some threshold "X"), then the same process mentioned in operation 530 may be repeated to identify the sub-patterns within a pattern. Splitting a pattern into its sub-patterns may provide more details about the patterns at a granular level.

At operation 550, the integrated system 200 may perform solution analysis. The solutions to customer tickets may be provided as a document that addresses a particular issue in a business process. The solutions may contain technical steps to follow or may additionally or alternatively contain code corrections to be implemented on customer systems.

At operation 560, the integrated system 200 may recommend an enablement session. The major issues occurring in a business process are represented by the major patterns/sub-patterns that are found. As the integrated system 200 now has all the customer incidents split into patterns/sub patterns, the integrated system 200 may use these results to do the following: (a) check if an enablement session exists for each of the patterns/sub patterns of issues; (b) if an enablement session already exists for a pattern of issue, it may be used to suggest to more customers to educate the customers about the issue that can occur in future; and (c) if no enablement session exists for a pattern of issue, the integrated system 200 suggests creating one for the same. The integrated system 200 may look for the top suggested solutions to recurrently occurring issues and suggest creating/enhancing enablement sessions out of them. If no enablement session exists for a highly re-used solution, then the integrated system 200 may suggest creating one for it so that customers are aware about the issue and its solution at first hand.

It is contemplated that any of the other features described within the present disclosure can be incorporated into the method 500.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: obtaining corresponding reference ticket data for each one of a plurality of reference tickets of an online system, the reference ticket data indicating a reference issue for a reference component and a reference solution that was used to resolve the reference issue; obtaining a plurality of learning content items from a learning management system; creating a mapping between the reference issues indicated by the reference ticket data for the plurality of reference tickets and the plurality of learning content items based on the reference ticket data of the plurality of reference tickets and the plurality of content items using an unsupervised machine learning algorithm; detecting target ticket data that has been provided by a user to the online system via a computing device, the target ticket data indicating a target issue for a target component; identifying a target solution for the target issue based on the target ticket data using the mapping between the reference issues indicated by the reference ticket data for the plurality of reference tickets and the plurality of learning content items; and causing a recommendation of the target solution to be displayed on the computing device.

Example 2 includes the computer-implemented method of example 1, wherein the online system comprises an information technology management (ITSM) system.

Example 3 includes the computer-implemented method of example 1 or example 2, wherein the obtaining the corresponding reference ticket data for each one of the plurality of reference tickets comprises: establishing a network connection with the online system using an application programming interface (API) for the online system; and obtaining the corresponding reference ticket data using the network connection with the online system.

Example 4 includes the computer-implemented method of any one of examples 1 to 3, wherein the obtaining the plurality of learning content items from the learning management system comprises using a data scraping program to extract the plurality of learning content items from the learning management system.

Example 5 includes the computer-implemented method of any one of examples 1 to 4, wherein the plurality of learning content items comprises online courses, online learning paths, online blogs, or online articles.

Example 6 includes the computer-implemented method of any one of examples 1 to 5, wherein the learning management system comprises a no-code implementation.

Example 7 includes the computer-implemented method of any one of examples 1 to 6, wherein the learning management system comprises a headless implementation.

Example 8 includes the computer-implemented method of any one of examples 1 to 7, wherein the unsupervised machine learning algorithm comprises a clustering algorithm.

Example 9 includes the computer-implemented method of any one of examples 1 to 8, wherein the recommendation of the target solution comprises steps for the user to perform to resolve the target issue.

Example 10 includes the computer-implemented method of any one of examples 1 to 9, wherein the recommendation of the target solution comprises one or more corrections to be implemented for code corresponding to the target component.

Example 11 includes the computer-implemented method of any one of examples 1 to 10, wherein the recommendation of the target solution comprises a selectable link to one of the plurality of learning content items.

Example 12 includes a system comprising: at least one processor; and a non-transitory computer-readable medium storing executable instructions that, when executed, cause the at least one processor to perform the method of any one of examples 1 to 11.

Example 13 includes a non-transitory machine-readable storage medium, tangibly embodying a set of instructions that, when executed by at least one processor, causes the at least one processor to perform the method of any one of examples 1 to 11.

Example 14 includes a machine-readable medium carrying a set of instructions that, when executed by at least one processor, causes the at least one processor to carry out the method of any one of examples 1 to 11.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 6:
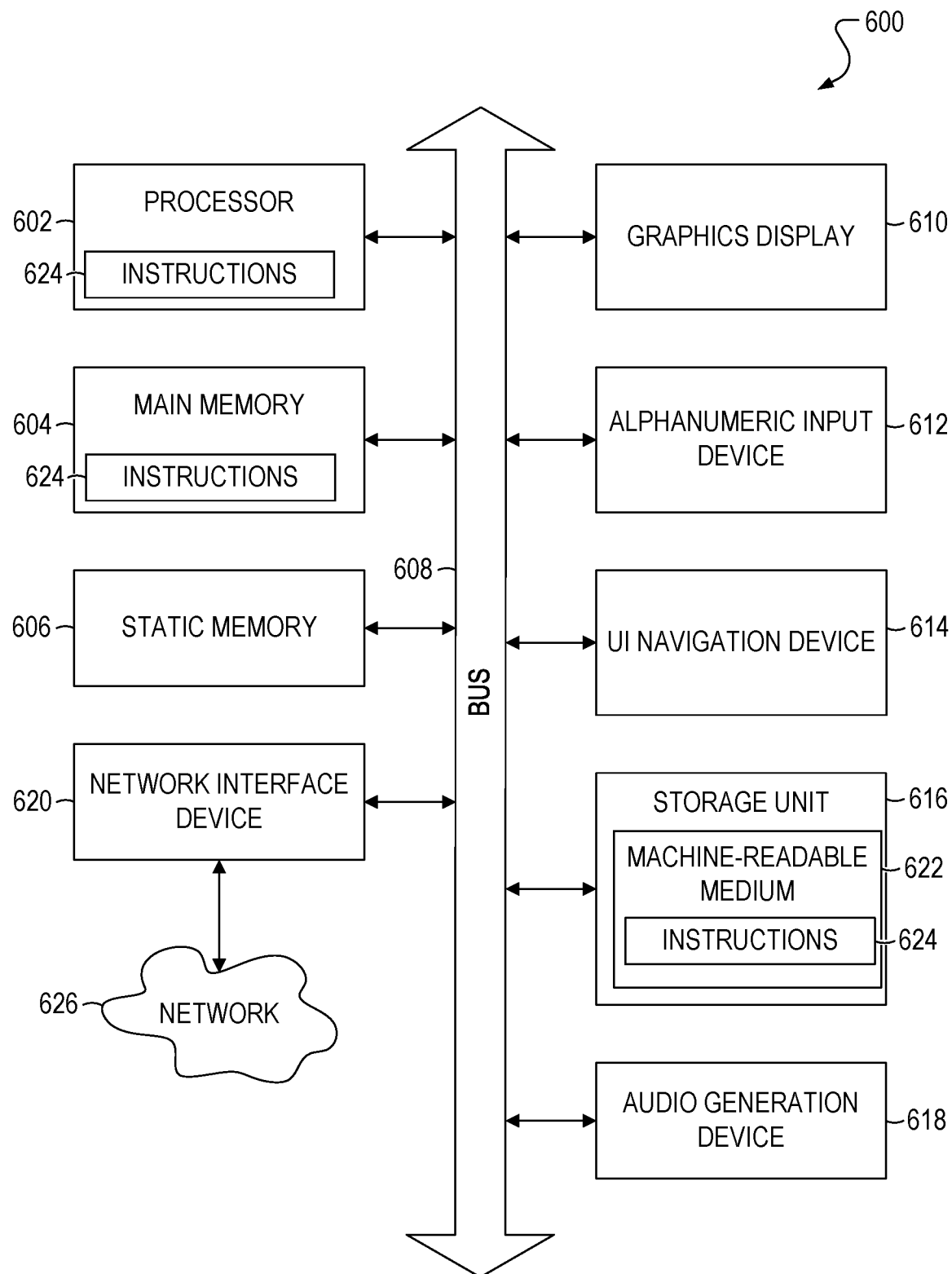
FIG. 6 is a block diagram of an example computer system on which methodologies described herein can be executed.

FIG. 6 is a block diagram of a machine in the example form of a computer system 600 within which instructions 624 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604, and a static memory 606, which communicate with each other via a bus 608. The computer system 600 may further include a graphics or video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a storage unit (e.g., a disk drive unit) 616, an audio or signal generation device 618 (e.g., a speaker), and a network interface device 620.

The storage unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method for integrating an online information technology management (ITSM) system and a learning management system, the computer-implemented method performed by a computer system comprising a memory and at least one hardware processor, the computer-implemented method comprising:
    obtaining corresponding reference ticket data for each one of a plurality of reference tickets of the online ITSM system via a network connection established with the online ITSM using an application programming interface (API) for the online ITSM system, the reference ticket data indicating a reference issue for a reference component and a reference solution that was used to resolve the reference issue;
    obtaining a plurality of learning content items from the learning management system, the obtaining the plurality of learning content items from the learning management system comprising using a data scraping program to extract the plurality of learning content items from the learning management system;
    creating a mapping between the reference issues indicated by the reference ticket data for the plurality of reference tickets and the plurality of learning content items based on the reference ticket data of the plurality of reference tickets and the plurality of content items using an unsupervised machine learning algorithm;
    detecting target ticket data that has been provided by a user to the online ITSM system via a computing device, the target ticket data indicating a target issue for a target component;
    identifying a target solution for the target issue based on the target ticket data using the mapping between the reference issues indicated by the reference ticket data for the plurality of reference tickets and the plurality of learning content items; and
    causing a recommendation of the target solution to be displayed on the computing device, the recommendation of the target solution comprising one or more corrections to be implemented for code corresponding to the target component.

2. The computer-implemented method of claim 1, wherein the plurality of learning content items comprises online courses, online learning paths, online blogs, or online articles.

3. The computer-implemented method of claim 1, wherein the learning management system comprises a no-code implementation.

4. The computer-implemented method of claim 1, wherein the learning management system comprises a headless implementation.

5. The computer-implemented method of claim 1, wherein the unsupervised machine learning algorithm comprises a clustering algorithm.

6. The computer-implemented method of claim 1, wherein the recommendation of the target solution comprises steps for the user to perform to resolve the target issue.

7. The computer-implemented method of claim 1, wherein the recommendation of the target solution comprises a selectable link to one of the plurality of learning content items.

8. A system of comprising:
    at least one hardware processor; and
    a non-transitory computer-readable medium storing executable instructions that, when executed, cause the at least one processor to perform computer operations for integrating an online information technology management (ITSM) system and a learning management system, the computer operations comprising:
        obtaining corresponding reference ticket data for each one of a plurality of reference tickets of the online ITSM system via a network connection established with the online ITSM using an application programming interface (API) for the online ITSM system, the reference ticket data indicating a reference issue for a reference component and a reference solution that was used to resolve the reference issue;
        obtaining a plurality of learning content items from the learning management system, the obtaining the plurality of learning content items from the learning management system comprising using a data scraping program to extract the plurality of learning content items from the learning management system;
        creating a mapping between the reference issues indicated by the reference ticket data for the plurality of reference tickets and the plurality of learning content items based on the reference ticket data of the plurality of reference tickets and the plurality of content items using an unsupervised machine learning algorithm;
        detecting target ticket data that has been provided by a user to the online ITSM system via a computing device, the target ticket data indicating a target issue for a target component;

identifying a target solution for the target issue based on the target ticket data using the mapping between the reference issues indicated by the reference ticket data for the plurality of reference tickets and the plurality of learning content items; and causing a recommendation of the target solution to be displayed on the computing device, the recommendation of the target solution comprising one or more corrections to be implemented for code corresponding to the target component.

9. The system of claim 8, wherein the plurality of learning content items comprises online courses, online learning paths, online blogs, or online articles.

10. The system of claim 8, wherein the learning management system comprises a no-code implementation.

11. The system of claim 8, wherein the learning management system comprises a headless implementation.

12. The system of claim 8, wherein the unsupervised machine learning algorithm comprises a clustering algorithm.

13. The system of claim 8, wherein the recommendation of the target solution comprises steps for the user to perform to resolve the target issue.

14. A non-transitory machine-readable storage medium tangibly embodying a set of instructions that, when executed by at least one hardware processor, causes the at least one processor to perform computer operations for integrating an online information technology management (ITSM) system and a learning management system, the computer operations comprising:

obtaining corresponding reference ticket data for each one of a plurality of reference tickets of the online ITSM system via a network connection established with the online ITSM using an application programming interface (API) for the online ITSM system, the reference ticket data indicating a reference issue for a reference component and a reference solution that was used to resolve the reference issue;

obtaining a plurality of learning content items from the learning management system, the obtaining the plurality of learning content items from the learning management system comprising using a data scraping program to extract the plurality of learning content items from the learning management system;

creating a mapping between the reference issues indicated by the reference ticket data for the plurality of reference tickets and the plurality of learning content items based on the reference ticket data of the plurality of reference tickets and the plurality of content items using an unsupervised machine learning algorithm;

detecting target ticket data that has been provided by a user to the online ITSM system via a computing device, the target ticket data indicating a target issue for a target component;

identifying a target solution for the target issue based on the target ticket data using the mapping between the reference issues indicated by the reference ticket data for the plurality of reference tickets and the plurality of learning content items; and causing a recommendation of the target solution to be displayed on the computing device, the recommendation of the target solution comprising one or more corrections to be implemented for code corresponding to the target component.

\* \* \* \* \*